Patented Apr. 2, 1946

2,397,895

UNITED STATES PATENT OFFICE 2,397,895

ORGANO-SILOXANES AND METHODS OF PREPARING THEM

Earl Leathen Warrick, Pittsburgh, Pa., assignor to Corning Glass Works, Corning, N. Y., a corporation of New York No Drawing. Application February 14, 1945, Serial No. 577,936

8 Claims. (Cl. 260—2)

This invention relates to methyl siloxanes and methods of preparing them.

Methyl siloxanes are compositions comprising essentially silicon atoms connected to each other by oxygen atoms through silicon-oxygen linkages, thus

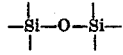

and methyl radicals attached through carbon-silicon linkages to at least some of the silicon atoms. They may be prepared by the hydrolysis of a hydrolyzable mono-, di-, or tri-methyl substituted monosilane followed by condensation (partial or complete) of the hydrolysis product. They may also be prepared by hydrolyzing and condensing mixtures of different hydrolyzable methyl silanes. In the latter case, hydrolyzable silanes which contain no methyl radicals attached to silicon through carbon-silicon linkages, such as silicon tetrachloride or ethyl orthosilicate, may be included with the methyl silanes, if desired. By employing such mixtures of silanes, it is possible to prepare methyl siloxanes which contain on the average between zero and three methyl radicals per silicon atom.

The products resulting from the hydrolysis and condensation of hydrolyzable methyl silanes or mixtures thereof differ considerably with respect to their ability to retain their physical properties at elevated temperatures. In general, the liquids become more viscous and lose weight when held at high temperatures for extended periods of time. Likewise the solids undergo loss in weight and tend to crack when subjected to high temperatures for prolonged periods. For many industrial applications, it is important that these products remain substantially unchanged when exposed to high temperatures for a long time. For example, as hydraulic fluids, they should not lose weight nor increase appreciably in viscosity. As solid insulating coatings for metallic conductors, they should not lose weight and crack.

It has been found that the thermal stability of the methyl siloxanes is greatly enhanced if they contain trimethyl silicyl units. The incorporation of the latter into the methyl siloxanes produces compositions which are relatively resistant to elevated temperatures for prolonged periods. A method of preparing such methyl siloxanes is described in the copending application of James Franklin Hyde, Serial Number 432,528, filed February 26, 1942. This method comprises hydrolyzing a mixture of silanes containing a hydrolyzable tri-methyl-substituted silane and inter-condensing the hydrolysis products. Although this method makes it possible to produce methyl siloxanes which represent a great improvement over the art, it possesses the objectionable feature that when sufficient trimethyl-silicyl units are introduced to effect the desired increase in stability, the resulting product in many instances is a liquid which has too low a viscosity. Furthermore, there are many applications which require materials of an even greater stability than this method can provide. Accordingly, it is an object of this invention to provide a method of preparing methyl siloxanes which possess a greater heat resistance and a higher viscosity than methyl siloxanes previously prepared and yet having substantially the same chemical composition.

Another object of my invention is to prepare new compositions of matter comprising methyl siloxanes of greatly improved resistance to change at elevated temperatures.

Other objects and advantages will be apparent from the following description.

In accordance with my invention, I have provided a method of preparing heat resistant methyl siloxanes which comprises interacting a partially condensed siloxane having on the average up to 2.5 methyl radicals attached to each silicon atom through carbon-silicon linkages with trimethyl-ethoxysilane in the presence of water. I have found that by this method methyl siloxanes may be prepared which are much more stable and more viscous than methyl siloxanes of the same average number of methyl radicals per silicon atom and which were prepared by concurrently hydrolyzing and condensing the trimethylethoxysilane and the other components of the methyl siloxane. The reason for this is not definitely established, but the increased stability of the product is quite impressive as will be clearly apparent from the examples given below.

In general, the preferred method of practicing my invention is as follows. An ethoxysilane having from 1 to 2 methyl radicals per silicon atom, either alone or in a mixture of ethoxysilanes containing on the average up to 2.5 methyl radicals per silicon atom, is first hydrolyzed by excess water under conditions which promote only partial condensation of the hydrolysis product. The following conditions aid in obtaining only partial condensation. The reaction should be carried out in a water miscible solvent and preferably in a dilute solution. The reaction temperature should be kept down since heat promotes dehydration and consequent condensation. To the reaction mixture is then added trimethylethoxysilane. The inter-condensation of the trimethylethoxysilane and the partially condensed hydrolysis product may take place at room temperature but is greatly accelerated if the reaction mixture is heated. The product is then washed free of acids, if present, and any solvents employed are removed. Low polymers are preferably removed by distilling the product up to about 200° C.

For a better understanding of my invention reference should be had to the following examples. The trimethylethoxysilane employed in these examples was prepared by treating dimethyldiethoxysilane with methyl Grignard reagent.

Example 1

A mixture consisting of 90 parts by weight of dimethyldiethoxysilane and 10 parts by weight of methyltriethoxysilane was refluxed for four hours with an equal volume of 1:1 alcohol and hydrochloric acid mixture. The latter mixture contained more than sufficient water to completely hydrolyze the silanes. At the conclusion of the refluxing, 10 parts by weight of trimethylethoxysilane was added dropwise to the mixture. Refluxing was continued for one hour. The product was washed and low polymers removed by distillation up to a temperature of 230° C. The viscosity of the product was 45.5 centistokes at 25° C.

When a trimethylethoxysilane was added to the mixture of methyltriethoxysilane and dimethyldiethoxysilane prior to hydrolysis and the resulting mixture treated in the same manner as above, a product having a viscosity of 21.9 centistokes was obtained.

The two products were heated to 200° C. and held there until gelation occurred. The product obtained by concurrently hydrolyzing and condensing the mixture of the three components gelled in 63 hours. On the other hand, the product obtained by first hydrolyzing the mixture of two components and then adding the third component gelled only after 256 hours of heating at 200° C.

Example 2

A mixture consisting of 75 parts by weight of dimethyldiethoxysilane and 25 parts by weight of methyltriethoxysilane was refluxed for four hours with an equal volume of 1:1 ethyl alcohol and hydrochloric acid mixture. At the conclusion of the refluxing, 25 parts by weight of trimethylethoxysilane were added dropwise to the mixture. Refluxing was continued for one hour. The product was washed and low polymers removed by distillation up to a temperature of 230° C. The viscosity of the product was 55.0 centistokes at 25° C.

When the trimethylethoxysilane was added to the mixture of methyltriethoxysilane and dimethyldiethoxysilane prior to hydrolysis and the resulting mixture treated in accordance with the procedure outlined above, a product having a viscosity of 14.5 centistokes was obtained.

The two products were heated to 200° C. and held there until gelation occurred. The product obtained by hydrolyzing the mixture of the three components gelled in 94 hours; whereas the product obtained by first hydrolyzing the mixture of two components and then adding the third component gelled only after 186 hours at 200° C.

Example 3

Ninety parts by weight of dimethyldiethoxysilane was hydrolyzed by adding twice the theoretical amount of water required and 3 per cent by weight of sulphuric acid based on the ester. The mixture was immediately stirred and distilled to 100° C. Following this 10 parts by weight of trimethylethoxysilane was added dropwise through a vertical condenser. The mixture was stirred at 100° C. for one hour, followed by washing and removal of low polymers by distillation up to a temperature of 230° C. The product had a viscosity of 30 centistokes at 25° C.

When the trimethylethoxysilane was added to the dimethyldiethoxysilane before hydrolysis, the product obtained by the above treatment had a viscosity of 11.9 centistokes.

The two products were heated to 200° C. and held there until gelation occurred. The product obtained by hydrolyzing the mixture of two components gelled in 276 hours; while the product obtained by hydrolyzing first one component and then adding the other component gelled only after 708 hours at 200° C.

Example 4

Seventy-five parts by weight of dimethyldiethoxysilane was hydrolyzed by adding twice the theoretical amount of water required and 3 per cent by weight of sulphuric acid based on the ester. The mixture was immediately stirred and distilled to 100° C. Following this 25 parts by weight of trimethylethoxysilane were added dropwise through a vertical condenser. The mixture was stirred at 100° C. for one hour, followed by washing and removal of low polymers by distillation up to a temperature of 230° C. The product had a viscosity of 22 centistokes at 25° C.

When the 25 parts of trimethylethoxysilane was added to the dimethyldiethoxysilane before hydrolysis, the product obtained by the above treatment had a viscosity of 5.4 centistokes.

The two products were heated to 200° C. and held there until gelation occurred. The product obtained by hydrolyzing the mixture of two components gelled in approximately 250 hours; while the product obtained by hydrolyzing first the one component and then adding the other component gelled only after approximately 700 hours at 200° C.

Example 5

A mixture of 85 mol per cent of methyltriethoxysilane and 15 mol per cent of trimethylethoxysilane was dropped into an equal volume of 2 N hydrochloric acid at such a rate that the temperature did not rise above 40° C. The mixture was then heated at 60° C. for one hour. Ten mol per cent of trimethylethoxysilane was then added. The resulting mixture was heated for another hour at 60° C. The product was then washed with water; dissolved in xylene and dried by refluxing in a system containing a water trap. The solvent was removed leaving a liquid of 18,000 centistokes viscosity. This liquid was heated 5 hours at 150° C. losing 26.1% of its weight and being converted to a solid resin in the process. Further heating at 250° C. for 16 hours, however, resulted in only 1.8% loss in weight.

When all the trimethylethoxysilane was added initially to the mixture, and hydrolyzed by the above technique, a liquid product of only 300 centistokes viscosity was produced. This lost 34.6% of its weight when heated for 5 hours at 150° C., being converted to a resinous solid in the process and 15% more of its weight when heated 16 hours at 250° C. as contrasted with the 1.8% in the case of the above-described liquid. Prior to heating at 150° C. both products had a carbon to silicon ratio of 1.45. Further evidence that the two products, although of substantially the same chemical composition, were structurally different was the difference in their solubility in alcohol. The product having the viscosity of 18,000 centistokes lost only 4% by weight when extracted once with 5 times its weight of alcohol while the liquid of 300 centistokes viscosity dissolved completely.

The products of my invention which remain liquid even at elevated temperatures are useful in hydraulic pressure systems or as liquid filling medium for transformers, circuit breakers, submarine cables, condensers, etc. The solid products are useful as molding compounds, film forming coatings, varnishes, impregnating agents for electrical insulation and the like.

I claim:

1. In the method of preparing new synthetic compositions from a partially condensed methyl siloxane having on the average up to about 2.5 methyl radicals per silicon atom, the step comprising inter-condensing said methyl siloxane with trimethylethoxysilane in the presence of water.

2. The method which comprises hydrolyzing a composition comprising a compound of the formula $(CH_3)_nSi(OC_2H_5)_{4-n}$, where $n$ is an integer from 1 to 2, partially condensing the methyl silicon hydrolysis product, then interacting said product with trimethylethoxysilane in the presence of water, and recovering the resulting methyl silicon copolymer.

3. The method according to claim 2 wherein the composition consists of dimethyldiethoxysilane.

4. The method according to claim 2 wherein the composition consists of dimethyldiethoxysilane and methyltriethoxysilane.

5. The method according to claim 2 wherein the composition consists of methyltriethoxysilane and trimethylethoxysilane.

6. The method which comprises hydrolyzing a composition comprising a compound of the formula $(CH_3)_nSi(OC_2H_5)_{4-n}$ with excess water, and in the presence of a hydrolysis catalyst, where $n$ is an integer from 1 to 2, partially condensing the hydrolysis product, adding trimethylethoxysilane to the mixture, and then continuing the condensation to substantial completion.

7. The method which comprises reacting dimethyldiethoxysilane with excess water in the presence of sulfuric acid, adding trimethylethoxysilane to the reaction product, dehydrating the resulting mixture, and then recovering the resulting methyl silicon copolymer.

8. The method which comprises reacting dimethyldiethoxysilane with excess water in the presence of sulfuric acid, distilling the reaction product to remove that part boiling below 100° C., adding trimethylethoxysilane to the residual reaction product, heating the resulting mixture at about 100° C. for at least one hour, washing the product, and distilling off the volatile components boiling below about 230° C.

EARL LEATHEN WARRICK.